US011822438B1

(12) United States Patent
Arora et al.

(10) Patent No.: US 11,822,438 B1
(45) Date of Patent: Nov. 21, 2023

(54) MULTI-COMPUTER SYSTEM FOR APPLICATION RECOVERY FOLLOWING APPLICATION PROGRAMMING INTERFACE FAILURE

(71) Applicant: Bank of America Corporation, Charlotte, NC (US)

(72) Inventors: Saurabh Arora, Gurugram (IN); Sandeep Kumar Chauhan, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 15 days.

(21) Appl. No.: 17/861,305

(22) Filed: Jul. 11, 2022

(51) Int. Cl.

| | |
|---|---|
| ***G06F 11/00*** | (2006.01) |
| ***G06F 11/14*** | (2006.01) |
| ***G06F 9/54*** | (2006.01) |
| ***G06F 11/07*** | (2006.01) |

(52) U.S. Cl.
CPC .......... *G06F 11/1471* (2013.01); *G06F 9/542* (2013.01); *G06F 11/0754* (2013.01); *G06F 11/143* (2013.01); *G06F 2201/865* (2013.01)

(58) Field of Classification Search
CPC ............... G06F 11/0754; G06F 11/143; G06F 11/1471; G06F 11/076; G06F 11/1479; G06F 9/54; G06F 9/547
See application file for complete search history.

(56) References Cited

U.S. PATENT DOCUMENTS

| | | | | |
|---|---|---|---|---|
| 9,507,579 | B2 | 11/2016 | Gambardella et al. | |
| 10,169,211 | B2 | 1/2019 | Kruglick | |
| 11,210,145 | B2 | 12/2021 | Walters et al. | |
| 2019/0155665 | A1 | 5/2019 | Bott | |
| 2020/0327113 | A1 | 10/2020 | Patiejunas et al. | |
| 2020/0394089 | A1* | 12/2020 | Garvey | G06F 11/076 |
| 2021/0064452 | A1* | 3/2021 | Nigam | H04L 41/0609 |
| 2022/0405119 | A1* | 12/2022 | Ortiz | G06F 9/485 |
| 2023/0124166 | A1* | 4/2023 | Mohanty | G06N 20/20 726/22 |
| 2023/0259415 | A1* | 8/2023 | Kairali | G06F 9/547 719/328 |

* cited by examiner

*Primary Examiner* — Marc Duncan
(74) *Attorney, Agent, or Firm* — Banner & Witcoff, Ltd.

(57) ABSTRACT

Arrangements for providing API failure detection and processing are provided. In some aspects, call logs including calls made to one or more APIs as well as a response code for each call may be received and a severity for each API may be determined. For instance, an API having a third severity may be detached from an associated application to disable functionality associated with that API. If an API is assigned a second severity, additional calls may be made to the API to confirm that the API is actually failing. The results of the additional calls may be analyzed and if a sufficient number of failures are detected, an instruction to detach the API may be generated and transmitted. In some arrangements, the error causing the failure may be remedied and the API may be reattached to the application.

21 Claims, 11 Drawing Sheets

MULTI-COMPUTER SYSTEM FOR APPLICATION RECOVERY FOLLOWING APPLICATION PROGRAMMING INTERFACE FAILURE

BACKGROUND

Aspects of the disclosure relate to electrical computers, systems, and devices for providing dynamic application modification and recovery following an application programming interface (API) failure.

Enterprise organizations employ, execute and host many applications that have various components that may be associated with one or more APIs. In some cases, one when one component fails, the entire application may be unable to function because computing resources may be directed to attempting to retry the process associated with the failing component. This may cause the user system to continue waiting for a result and may result in a slowdown in responsiveness for the user and, in some cases, ultimately result in a crash of the system. Accordingly, it may be advantageous to identify failing components and APIs and deactivate or detach the impacted API(s) from the application until an issue is addressed, thereby preventing the system from focusing computing resources on that API and avoiding a cascading effect on other functions of the application.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical issues associated with identifying failing application programming interfaces (APIs) and avoiding a cascading impact of failing APIs on other functions associated with an application.

In some aspects, call logs may be received. For instance, as users interact with a graphical user interface of an application, one or more APIs associated with the application may be called in order to retrieve data. These calls may be logged, along with a response code indicating whether a call was successful or not. In some examples, the call logs may be analyzed to identify any API failures (e.g., calls that were not successful). In some examples, a severity may be determined for each API. For instance, a first severity may be assigned if no failures are detected, a second severity may be assigned if at least one but fewer than a threshold number of failures are detected, and a third severity may be assigned if at least the threshold number of failures are detected.

Based on the identified severity, further processing may be performed. For instance, an API having the third severity may be detached from an associated application or application flow to disable functionality associated with that API. In some examples, detaching the API may include preventing the application from calling the API and/or providing a visual indication that one or more options or functions are not available for selection via a user interface of the application.

In some examples, if an API is assigned a second severity, one or more additional calls may be made to the API to confirm that it is actually failing and that the at least one failure was not an intermittent issue. For instance, sample request data for the API may be retrieved and used to call the API. The call log may be updated with results of the one or more additional calls and if a sufficient number of failures are detected, an instruction to detach the API may be generated and transmitted.

In some arrangements, data associated with the failing API may be used to initiate a contingency process to remedy an error causing the failure. For instance, one or more mitigation actions may be identified and executed to address the error. Upon detecting the API is no longer failing (e.g., based on subsequent calls that were successful), the API may be reattached to the application or application flow.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 4 and 5 illustrate example user interfaces that may be generated in accordance with one or more aspects described herein.

DETAILED DESCRIPTION

Figure 1A:
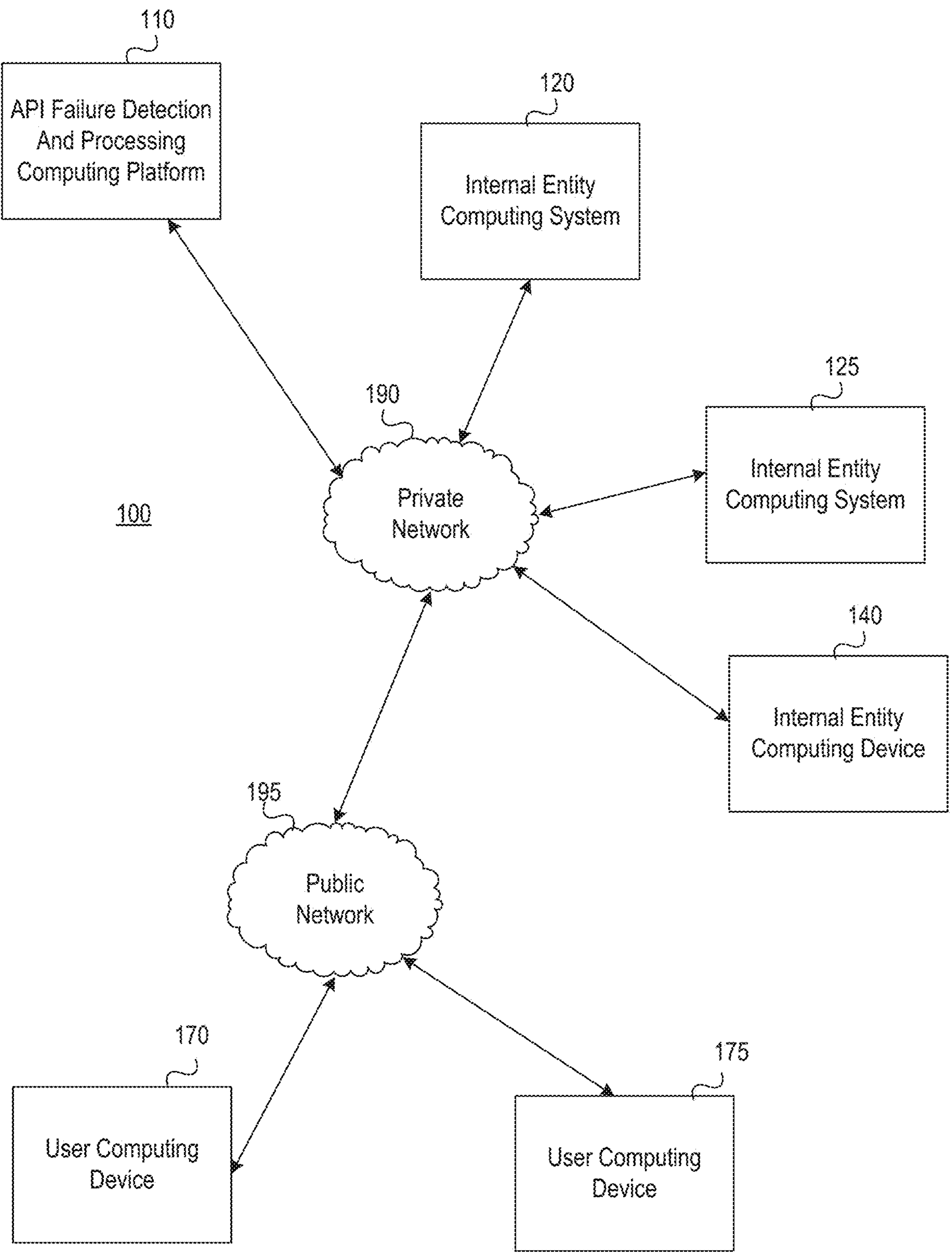
FIGS. 1A and 1B depict an illustrative computing environment for implementing API failure detection and processing functions in accordance with one or more aspects described herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As discussed above, applications may rely on a plurality of application programming interfaces (APIs) to function correctly. However, when one API fails, it may result in extended wait times for a user accessing the application, reallocation of computing resources to the failing API, and, in some examples, failure or crash of the entire application. Accordingly, detecting failing APIs in real-time and detaching or removing them from the flow may aid in maintaining efficient operation of the application.

Accordingly, as discussed more fully herein, call logs associated with each call made to an API associated with an application may be received and analyzed. The call logs may include calls to one or more APIs, as well as response codes generated in response to each call. In some examples, the calls may be analyzed to determine a severity associated with a response code. For instance, if no failure is detected, a first severity may be assigned. If more than one but fewer than a threshold number of failures is detected, a second severity may be assigned. If more than a threshold number of failures is detected, a third severity may be assigned.

In some arrangements, based on the severity, additional processing may be performed. For instance, for each API having a third severity, the API may be detached or removed from one or more flows of the application. In some examples, this may result in some functionality associated with the application being unavailable until the API is reattached or reactivated. For APIs having a second severity, in some examples, additional calls to the API may be triggered to confirm that the API is failing and that a failure is not just an intermittent issue. If additional calls result in failure, the API may be detached or removed from the application flows to prevent impact to other aspects of the application.

In some examples, detaching or removing an API from the application flow may include initiating a contingency process. In some examples, the contingency process may implement one or more automatic process to address an error or may request user input to correct an error causing the API failure. Upon remedying the error, the API may be reattached or reactivated within the application flow.

These and various other arrangements will be discussed more fully below.

Figure 1B:
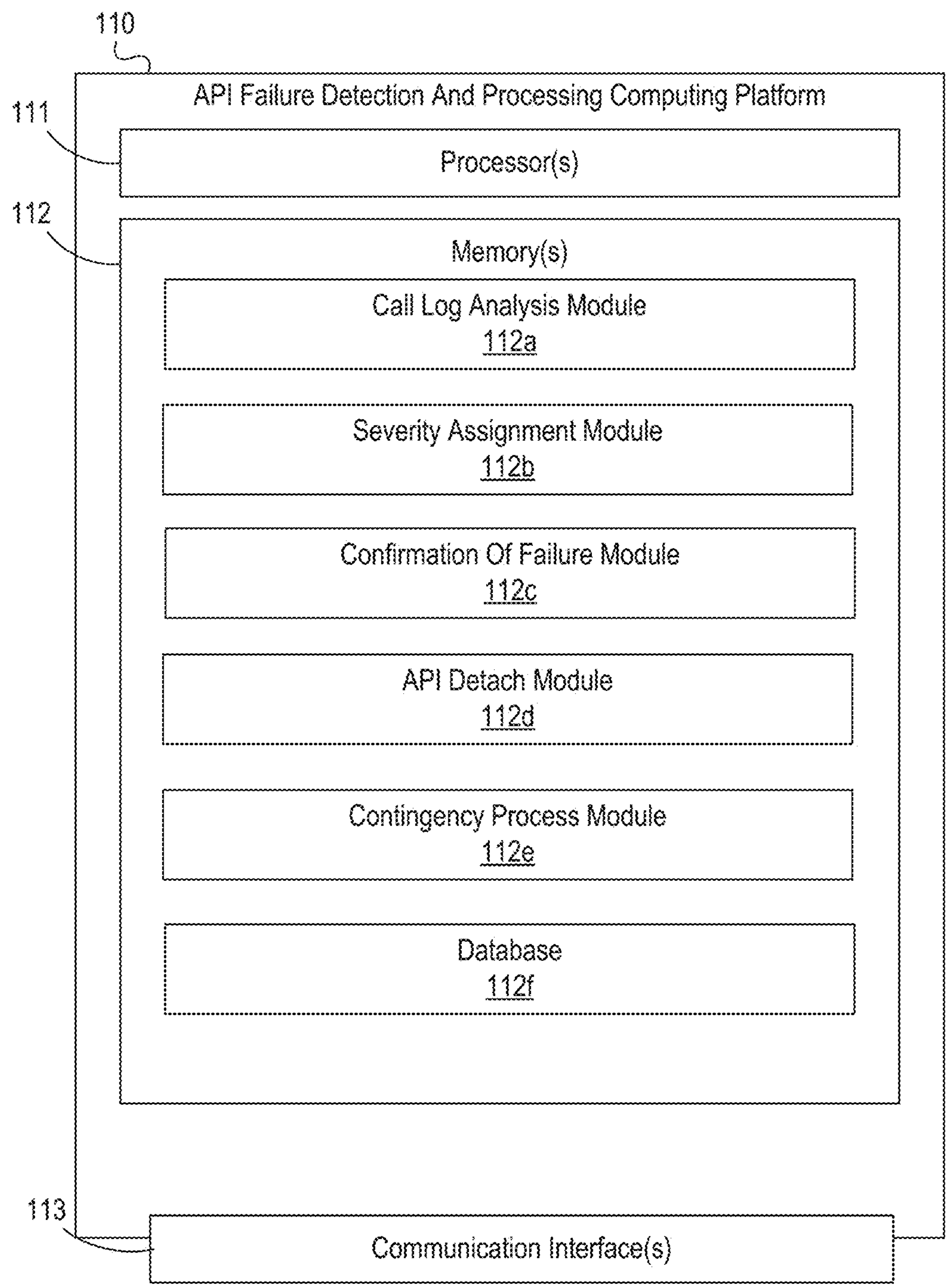

Aspects described herein may be implemented using one or more computing devices operating in a computing environment. For instance, FIGS. 1A-1B depict an illustrative computing environment for implementing API failure detection and processing functions in accordance with one or more aspects described herein. Referring to FIG. 1A, computing environment 100 may include one or more computing devices and/or other computing systems. For example, computing environment 100 may include API failure detection and processing computing platform 110, internal entity computing system 120, internal entity computing system 125, internal entity computing device 140, user computing device 170, and/or user computing device 175. Although two internal entity computing systems 120, 125 one internal entity computing device 140, and two user computing devices 170, 175 are shown, any number of systems or devices may be used without departing from the invention.

API failure detection and processing computing platform 110 may be configured to perform intelligent, dynamic, and efficient API failure detection and processing functions. In some examples, API failure detection and processing computing platform 110 may perform one or more functions in real-time or near-real time. For instance, one or more transaction or call logs associated with calls to one or more APIs associated with an application may be received. The transaction or call logs may be analyzed to determine a severity associated with each API based on response codes for each transaction or API call. For instance, if no failure has been detected, a first severity may be identified. If at least one failure but less than a threshold number of failures has been detected, a second severity may be identified. If at least the threshold number of failures is detected, a third severity may be identified.

In some examples, for each API having a third severity, API failure detection and processing computing platform 110 may generate an instruction to detach or remove the API from one or more application flows (e.g., remove functionality associated with the API to prevent calls to the failing API). The instruction may be transmitted to a system hosting the application or API and may be executed to remove or detach the API from the application flow.

In some examples, for APIs having a second severity, one or more additional calls may be initiated to the API. For instance, a document identifier and database associated with the failing API may be retrieved and sample request data from the cache associated with the identified document may be used to initiate one or more additional or subsequent calls to the API. The response codes associated with the one or more additional or subsequent calls may be recorded in the transaction logs and if additional failures (or at least a threshold number of failures has occurred), the API may be detached or removed from the application flows and any subsequent calls to the API may be prevented. For instance, options available via a user interface that may rely on the impacted API may be grayed out or unavailable for selection until the API issue is addressed and the API is reattached to the flow.

API failure detection and processing computing platform 110 may further initiate one or more contingency processes to correct the error causing the failure and/or mitigate impact of the failure. For instance, API failure detection and processing computing platform 110 may retrieve details associated with any APIs that have been detached from the application, as well as response codes associated with one or more failures of the API and may transmit the information for mitigation actions. For instance, the API details and response codes may be evaluated to determine whether one or more response codes are known response codes (e.g., are stored in a database as having previously been addressed). If so, one or more mitigating actions may be automatically identified and implemented (e.g., based on previous actions taken with respect to the known response code). If the one or more response codes are not known, the details and associated data may be transmitted to a user to investigate the failure of the API, address any identified issues and flag the API when ready to return to use.

Internal entity computing system 120 and/or internal entity computing system 125 may be or include one or more computing systems, devices, or the like, that may host or execute one or more applications of an enterprise organization. For instance, internal entity computing system 120 and/or internal entity computing system 125 may host or execute one or more applications in use by an enterprise organization (e.g., internally during the course of business, externally to provide services to one or more customers, and the like). Accordingly, internal entity computing system 120 and/or internal entity computing system 125 may receive requests for data (e.g., via a user interface layer of a respective application) and may execute one or more APIs to facilitate data requests. Accordingly, as calls to APIs are made, internal entity computing system 120 and/or internal entity computing system 125 may store transaction or call log data including a record of the call, response code associated with the call, and the like. This data may then be analyzed by API failure detection and processing computing platform 110 to identify and detach failing APIs.

Internal entity computing device 140 may be a computing device configured to communicate with API failure detection and processing computing platform 110. For instance, internal entity computing device 140 may be a computing device associated with a user within the enterprise organization that may investigate failing or failed APIs that do not have a known response code (e.g., for which an automatic response is not executed), to confirm an identified automatic response in cases in which confidence in the response is low (e.g., when the response code has been addressed fewer than a threshold number of time), or the like.

User computing device 170 and/or user computing device 175 may be or include one or more user computing devices (e.g., smart phones, wearable devices, laptops, desktops, tablets, or the like) that may be used (e.g., by an employee of the enterprise organization, by a customer of the enterprise organization, or the like) to display one or more user interfaces associated with an application, receive user input requesting data via the one or more user interface, display requested data and/or associated graphical user interfaces, and the like. In some examples, user interfaces associated with the application and displayed by a display of user computing device 170 and/or user computing device 175 may include grayed out or otherwise unavailable options that may be associated with functions associated with one or more detached or deactivated APIs (e.g., one or more APIs that has failed and been removed from the application flow). Once the API is reactivated or reattached to the application, the option may appear as selectable again.

As mentioned above, computing environment 100 also may include one or more networks, which may interconnect one or more of API failure detection and processing computing platform 110, internal entity computing system 120, internal entity computing system 125, internal entity computing device 140, user computing device 170 and/or user computing device 175. For example, computing environment 100 may include private network 190 and public network 195. Private network 190 and/or public network 195 may include one or more sub-networks (e.g., Local Area Networks (LANs), Wide Area Networks (WANs), or the like). Private network 190 may be associated with a particular organization (e.g., a corporation, financial institution, educational institution, governmental institution, or the like) and may interconnect one or more computing devices associated with the organization. For example, API failure detection and processing computing platform 110, internal entity computing system 120, internal entity computing system 125, and/or internal entity computing device 140, may be associated with an enterprise organization (e.g., a financial institution), and private network 190 may be associated with and/or operated by the organization, and may include one or more networks (e.g., LANs, WANs, virtual private networks (VPNs), or the like) that interconnect API failure detection and processing computing platform 110, internal entity computing system 120, internal entity computing system 125, and/or internal entity computing device 140, and one or more other computing devices and/or computer systems that are used by, operated by, and/or otherwise associated with the organization. Public network 195 may connect private network 190 and/or one or more computing devices connected thereto (e.g., API failure detection and processing computing platform 110, internal entity computing system 120, internal entity computing system 125, and/or internal entity computing device 140) with one or more networks and/or computing devices that are not associated with the organization. For example, user computing device 170 and/or user computing device 175, might not be associated with an organization that operates private network 190 (e.g., because user computing device 170 and/or user computing device 175 may be owned, operated, and/or serviced by one or more entities different from the organization that operates private network 190, one or more customers of the organization, one or more employees of the organization, public or government entities, and/or vendors of the organization, rather than being owned and/or operated by the organization itself), and public network 195 may include one or more networks (e.g., the internet) that connect user computing device 170 and/or user computing device 175 to private network 190 and/or one or more computing devices connected thereto (e.g., API failure detection and processing computing platform 110, internal entity computing system 120, internal entity computing system 125, and/or internal entity computing device 140).

Referring to FIG. 1B, API failure detection and processing computing platform 110 may include one or more processors 111, memory 112, and communication interface 113. A data bus may interconnect processor(s) 111, memory 112, and communication interface 113. Communication interface 113 may be a network interface configured to support communication between API failure detection and processing computing platform 110 and one or more networks (e.g., private network 190, public network 195, or the like). Memory 112 may include one or more program modules having instructions that when executed by processor(s) 111 cause API failure detection and processing computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of API failure detection and processing computing platform 110 and/or by different computing devices that may form and/or otherwise make up API failure detection and processing computing platform 110.

For example, memory 112 may have, store and/or include call log analysis module **112*a*. Call log analysis module 112*a* may store instructions and/or data that may cause or enable the API failure detection and processing computing platform 110 to receive transaction or call logs from one or more applications (e.g., internal-facing applications hosted by the enterprise organization, external-facing applications hosted by the enterprise organization, and the like). The call logs may include one or more calls to one or more APIs associated with one or more applications. In some examples, the call logs may include a response code associated with each call to each API. In some arrangements, the response codes may indicate whether the call was successful, whether the call failed, why the call failed (e.g., a reason code associated with the failure), and the like. In some examples, the call logs may be received from a database associated with one or more internal entity computing systems (e.g., internal entity computing system 120, internal entity computing system 125**). For instance, the call logs may be stored in a transaction log of a distributed database. In addition to the call log, a mapping record providing document identification for each API may also be stored in the database. In some examples, documents may be placed in a cache layer and may include sample request data that may be retrieved and used to trigger additional calls to one or more APIs.

API failure detection and processing computing platform 110 may further have, store and/or include severity assignment module **112*b*. Severity assignment module 112*b* may store instructions and/or data that may cause or enable the API failure detection and processing computing platform 110** to review and analyze the call logs from one or more applications and assign a severity for APIs having failing transactions or calls. For instance, APIs having no failures may be assigned a first severity. In some examples, APIs having at least one failure but fewer than a threshold number of failures may be assigned a second severity. Further still, APIs having at least a threshold number of failures (or at least a threshold number of consecutive failures) may be assigned a third severity.

In some examples, call logs may be received by the API failure detection and processing computing platform 110 and analyzed in real-time as updates to the call logs are received (e.g., as calls are made to one or more APIs and a response code is generated). Additionally or alternatively, call logs may be received and analyzed in a batch transfer process at periodic or aperiodic intervals.

In some examples, for APIs having, for instance, the second severity, one or more processes to confirm failure of the API may be executed. For instance, confirmation of failure module 112*c* may store instructions and/or data that may cause or enable the API failure detection and processing computing platform 110 to retrieve, from a database (e.g., a database of the internal entity computing system 120, 125) a document identifier associated with the API being evaluated (e.g., based on a mapping record in the database). The document identifier may then be used to identify and retrieve sample request data for use in one or more subsequent calls to the API. The confirmation of failure module 112*c* may generate instructions to initiate one or more subsequent calls to the API and may transmit the instruction, and identified sample data, to the internal entity computing system 120, 125 for execution. The one or more subsequent calls may generated one or more response codes that may be stored in, for instance, updated transaction or call logs that may be sent to the API failure detection and processing computing platform 110 for further analysis and/or confirmation of failure (e.g., determination of at least a threshold number of failures, or the like).

API failure detection and processing computing platform 110 may further have, store and/or include API detach module 112*d*. API detach module 112*d* may generate one or more instructions to detach or remove a failing API (e.g., as based on determined severity and/or confirmation of failure) from one or more application flows. The instruction may cause one or more graphical user interfaces to be modified to gray our or otherwise make unavailable options associated with the application that would initiate a call to the detached or removed API. Accordingly, the failing API might not slow or impede functionality of the application overall. Rather, functionality may just be limited because some features might not be available based on APIs being detached.

API failure detection and processing computing platform 110 may further have, store and/or include contingency process module 112*e*. Contingency process module 112*e* may store instructions and/or data that may cause or enable the API failure detection and processing computing platform 110 to initiate one or more mitigation actions. For instance, API details, error codes, response codes, and the like, may be transmitted to contingency process module 112*e* and/or one or more user devices, such as internal entity computing device 140. In some examples, contingency process module 112*e* may determine whether the error code is a known error code and, if so, a predetermined solution or fix may be implemented or executed. In some examples, a confidence score associated with the error code may be identified and, if above a threshold, the identified solution may be automatically implemented. If the score is below the threshold, in some examples, user input may be requested before implementing the solution. If the error code is not known, in some examples, user investigation of the error may be performed and one or more actions may be executed to address the error. The error code and actions may then be stored for future use.

API failure detection and processing computing platform 110 may further have, store and/or include a database. In some examples, database 112*f* may store known error codes, previously implemented solutions, and the like. Additional data may be stored in database 112*f* without departing from the invention.

FIGS. 2A-2F depict one example illustrative event sequence for implementing API failure detection and processing functions in accordance with one or more aspects described herein. The events shown in the illustrative event sequence are merely one example sequence and additional events may be added, or events may be omitted, without departing from the invention. Further, one or more processes discussed with respect to FIGS. 2A-2F may be performed in real-time or near real-time.

Figure 2A:
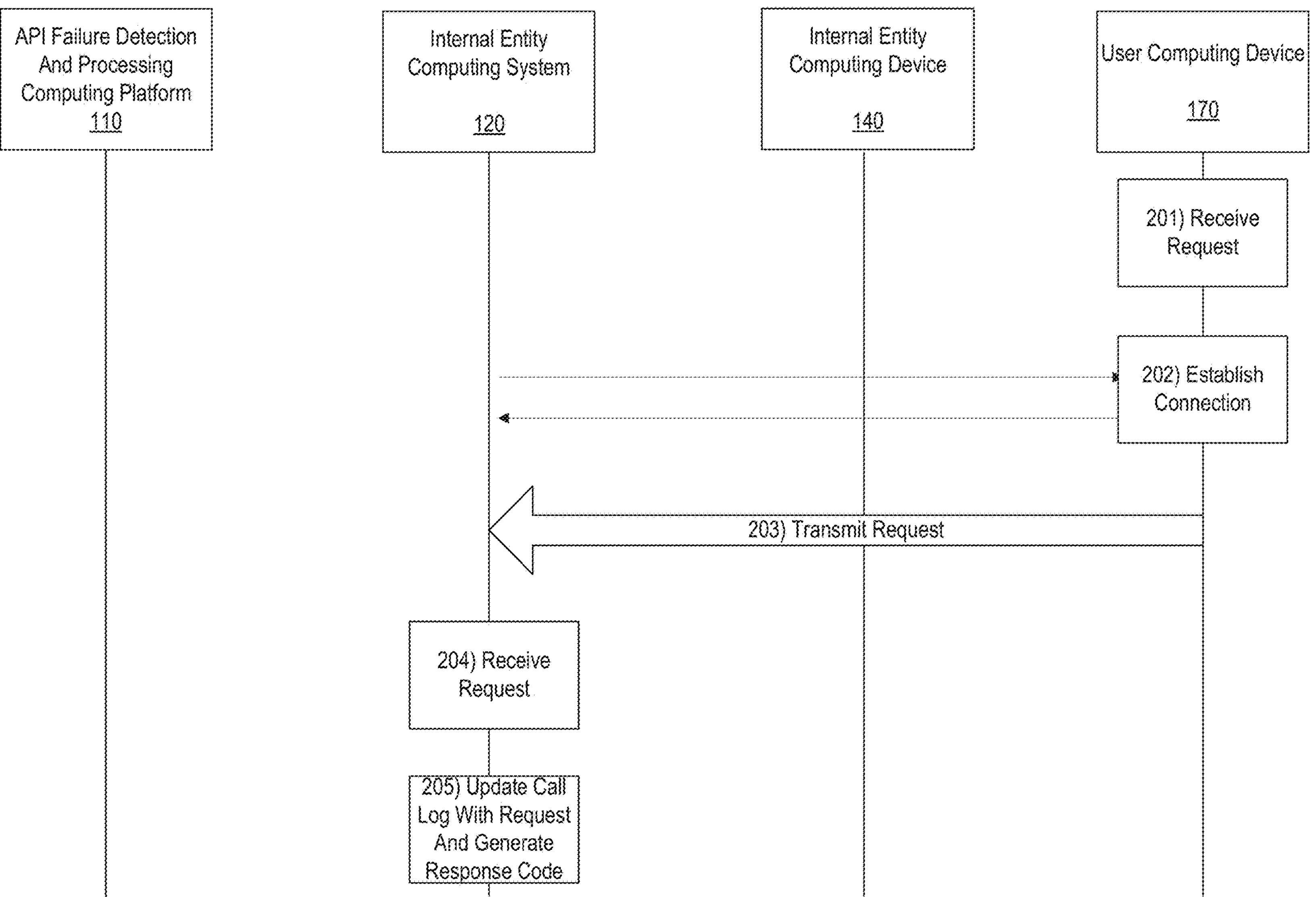
FIGS. 2A-2F depict an illustrative event sequence for implementing API failure detection and processing functions in accordance with one or more aspects described herein.

With reference to FIG. 2A, at step 201, user computing device 170 may receive a request to access data via, for instance, a graphical user interface displayed by a display of the user computing device 170 and associated with an application hosted by an enterprise organization (e.g., by internal entity computing system 120). For instance, the user may select an option available via the graphical user interface to request data.

At step 202, user computing device 170 may connect to internal entity computing system 120. For instance, a first wireless connection may be established between user computing device 170 and internal entity computing system 120. Upon establishing the first wireless connection, a communication session may be initiated between user computing device 170 and internal entity computing system 120. In some examples, user computing device 170 may determine that a connection already exists. If so, an additional connection might not be established.

At step 203, the user computing device 170 may send or transmit the request for data to the internal entity computing system 120. For instance, request for data may be transmitted during the communication session initiated upon establishing the first wireless connection.

At step 204, internal entity computing system 120 may receive the request transmitted at step 203 and may process to execute the request.

Responsive to processing or executing the request, at step 205, a call log may be updated to include the request for data (e.g., one or more calls to one or more APIs associated with the application and the requested data) and one or more generated response codes associated with the calls.

Figure 2B:
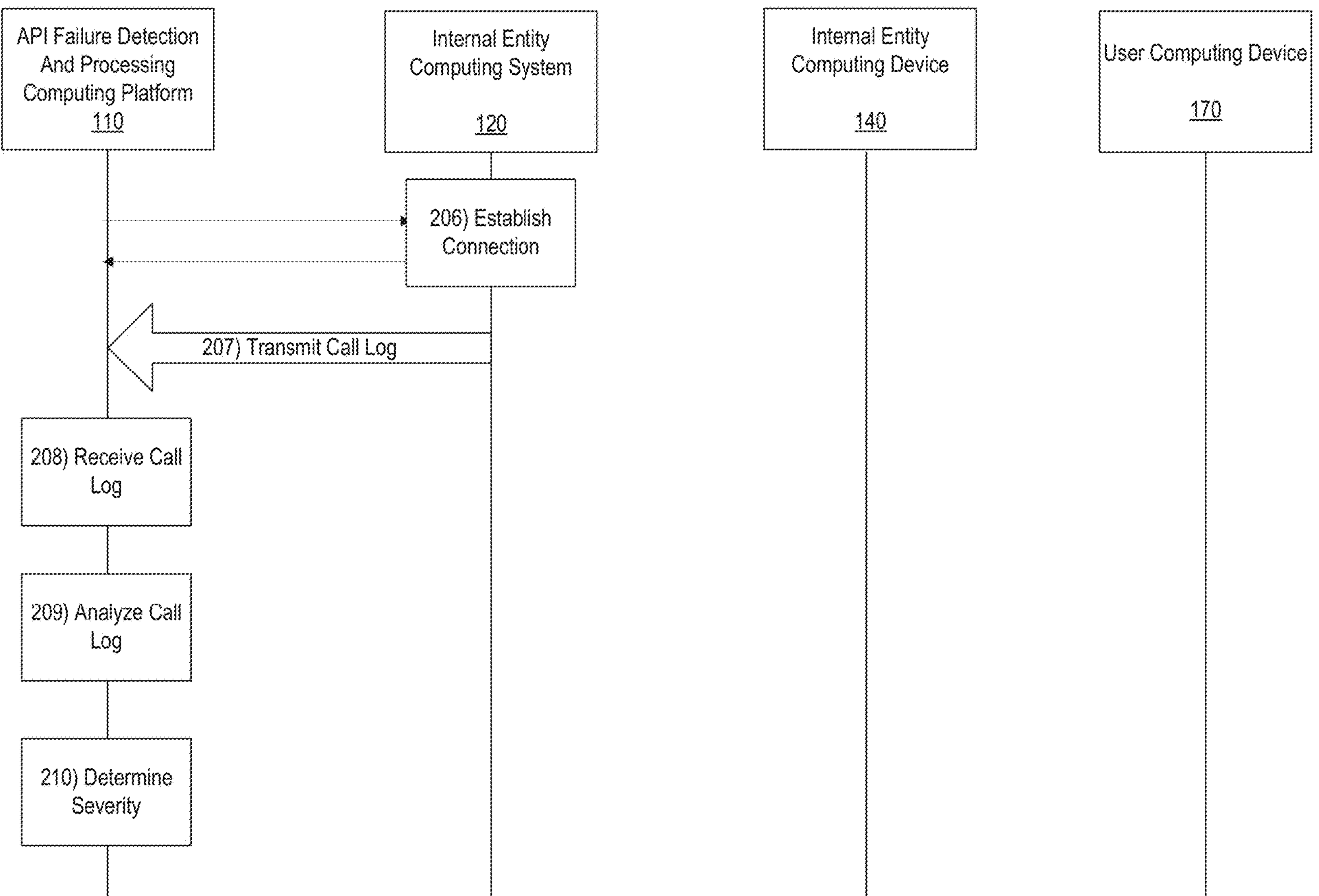

With reference to FIG. 2B, at step 206, internal entity computing system 120 may connect to API failure detection and processing computing platform 110. For instance, a second wireless connection may be established between internal entity computing system 120 and API failure detection and processing computing platform 110. Upon establishing the second wireless connection, a communication session may be initiated between internal entity computing system 120 and API failure detection and processing computing platform 110. In some examples, internal entity computing system 120 may determine that a connection already exists. If so, an additional connection might not be established.

At step 207, the internal entity computing system 120 may transmit the call log to the API failure detection and processing computing platform 110. For instance, the call log may be transmitted during the communication session initiated upon establishing the second wireless connection.

At step 208, API failure detection and processing computing platform 110 may receive the call log transmitted at step 207. At step 209, the API failure detection and processing computing platform 110 may analyze the call log. For instance, each call associated with each API may be analyzed to determine whether the response code associate with the call indicates a failure of the call or API.

At step 210, based on the analyzed call log, API failure detection and processing computing platform 110 may determine a severity for each call or API. For instance, if no failures are detected, a first severity may be assigned to the API. Further, if at least one failure but fewer than a threshold number of failures (e.g., fewer than 3 failures, fewer than 5 failures, or the like) are detected, a second threshold may be assigned. If at least a threshold number of failures (or at least a threshold number of consecutive failures) are detected, a third severity may be assigned. For APIs having the first threshold, no action may be taken as the APIs are not failing. For APIs having the third severity, the process may continue at step 218 in FIG. 2D.

Figure 2C:
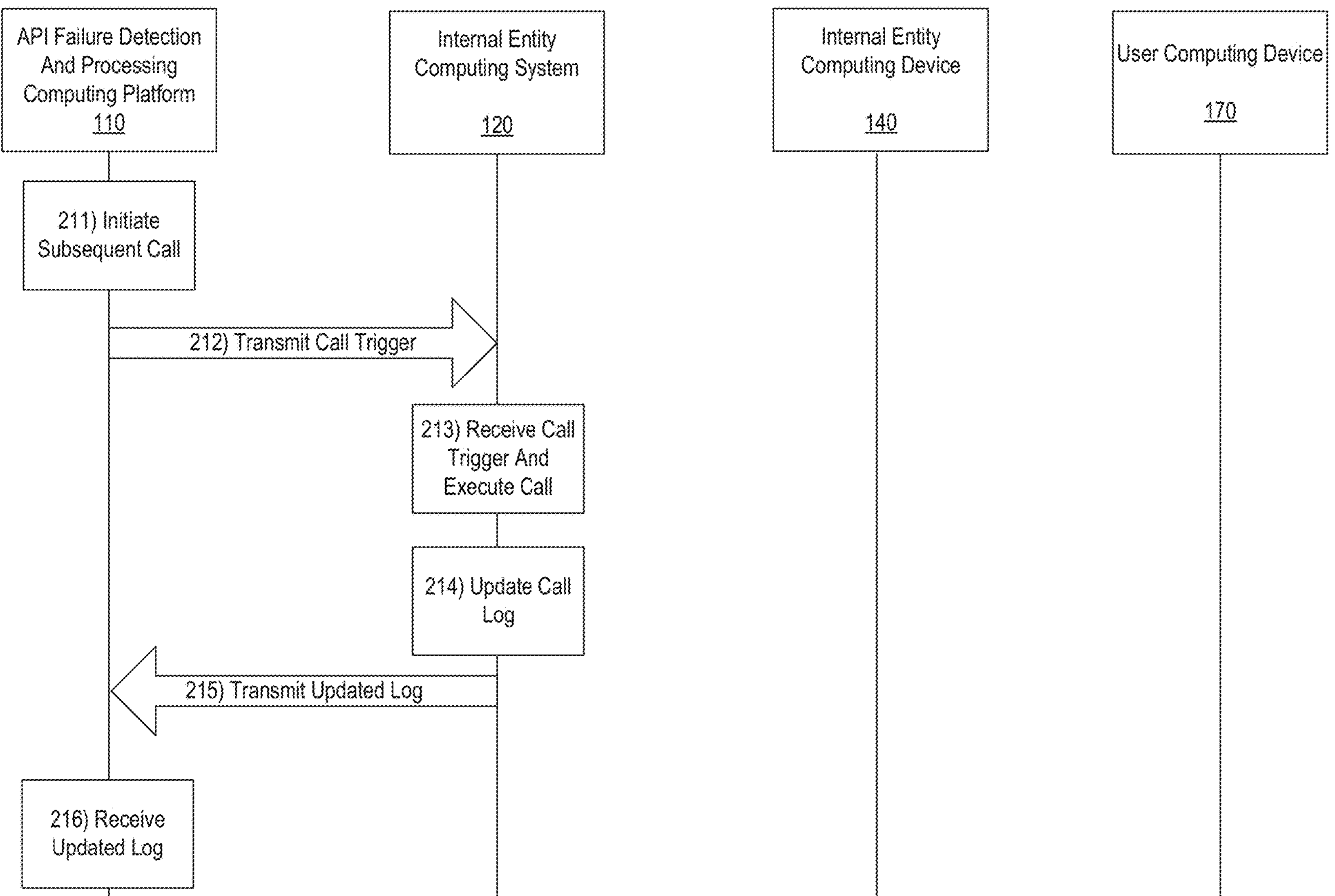

With reference to FIG. 2C, at step 211, for APIs having a second severity (e.g., more than one failure but less than a threshold number of failures) one or more subsequent calls to the API may be initiated to confirm status of the API (e.g., confirm whether the API is failing). For instance, a document identifier may be obtained based on the API details and sample request data may be retrieved. Accordingly, at step 211, one or more subsequent calls to the API may be initiated using the sample request data.

At step 212, the one or more subsequent calls to the API may include transmitting a call trigger to the internal entity computing system 120. The call trigger may include the sample request data.

At step 213, the call trigger may be received and executed. Based on the execution, one or more call logs may be updated at step 214 to include the one or more subsequent calls, as well as response codes generated in response to the one or more subsequent calls.

At step 215, the internal entity computing system 120 may transmit the updated call logs to the API failure detection and processing computing platform 110.

At step 216, the API failure detection and processing computing platform may receive the updated call log.

Figure 2D:
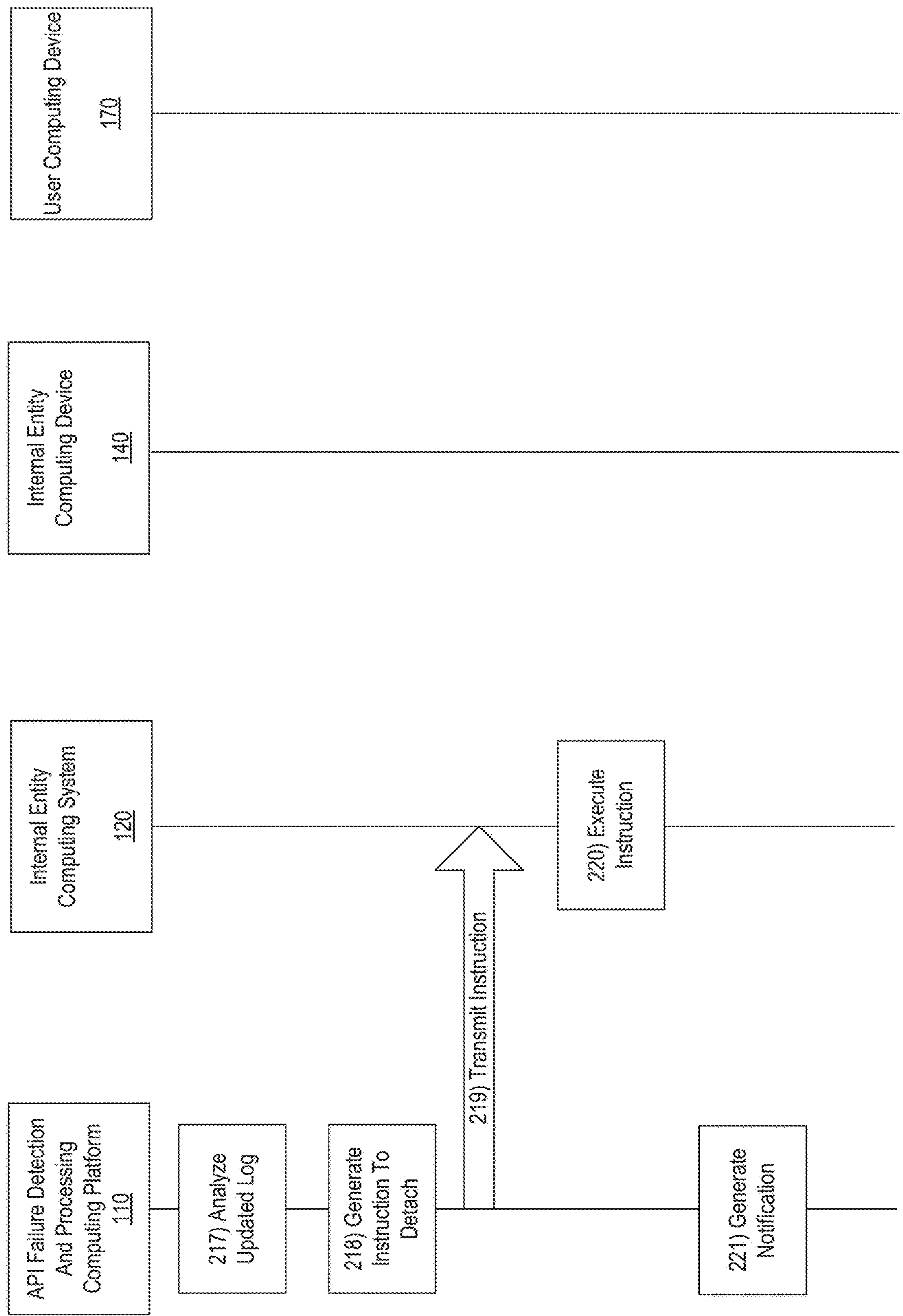

With reference to FIG. 2D, at step 217, the updated call log may be analyzed to determine a severity (e.g., whether the one or more subsequent calls failed). If the severity meets criteria for a third severity, the API may be flagged to be detached or removed from the application flow.

At step 218, for calls or APIs having the second severity and the one or more subsequent calls failed, as well as APIs having the third severity determined at step 210, API failure detection and processing computing platform 110 may generate an instruction to detach or remove the API from one or more application flows. For instance, API failure detection and processing computing platform 110 may generate an instruction including API details to a user interface layer at internal entity computing system 120 causing the impacted or failing APIs to be removed or detached from the application flow.

At step 219, API failure detection and processing computing platform 110 may transmit the instruction to internal entity computing system 120. At step 220, the internal entity computing system 120 may execute the instructions. In some examples, executing the instruction may push the instruction to the user interface layer of a respective application which may modify an appearance of the graphical user interface associated with the application and may modify functionality of the application. For instance, features that may be associated with the detached API may be grayed out or otherwise unavailable for selection to prevent the application from calling the failing APIs. For instance, FIG. 4 illustrates one example graphical user interface 400 including four options but having only 3 available for selection. An API associated with option 3 may be detached from the application or application flow based on an identified failure and, accordingly, option 3 is shown as grayed out or unavailable for selection.

At step 221, a notification of the API being detached or removed may be generated.

Figure 2E:
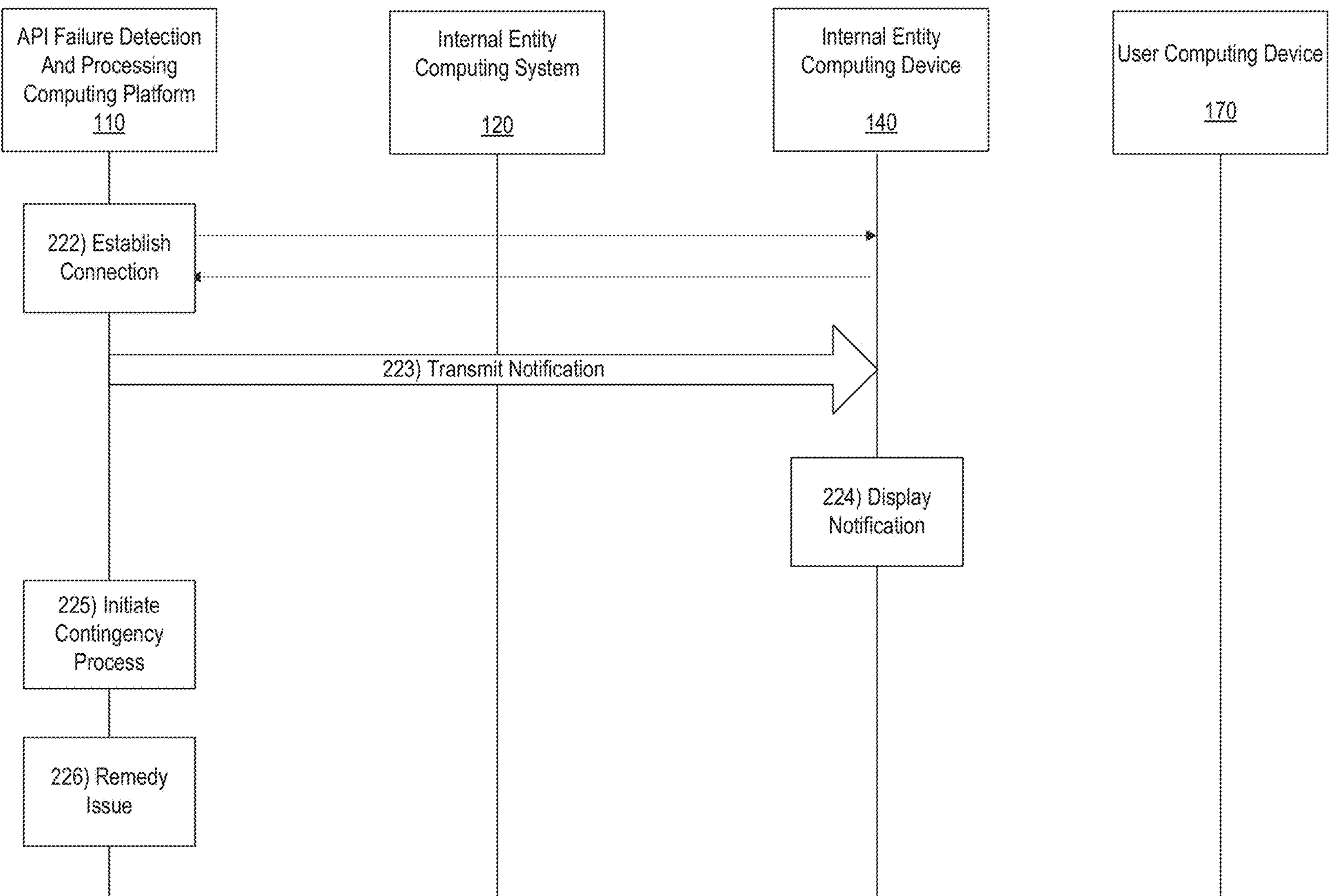

With reference to FIG. 2E, at step 222, API failure detection and processing computing platform 110 may connect to internal entity computing device 140. For instance, a third wireless connection may be established between API failure detection and processing computing platform 110 and internal entity computing device 140. Upon establishing the third wireless connection, a communication session may be initiated between API failure detection and processing computing platform 110 and internal entity computing device 140. In some examples, if a connection already exists, an additional connection might not be established.

At step 223, API failure detection and processing computing platform 110 may transmit or send the generated notification to the internal entity computing device 140. For instance, the notification may be sent during the communication session initiated upon establishing the third wireless connection. In some examples, transmitting the notification may cause the notification to be displayed on a display of internal entity computing device 140.

Accordingly, at step 224, internal entity computing device 140 may receive the notification and display the notification.

At step 225, API failure detection and processing computing platform 110 may initiate a contingency process to remedy the error causing the API failure, mitigate damage associated with the failure, and the like. In some examples, initiating the contingency process may include evaluating API details associated with the detached or removed API including, for instance, an error code associated with the failure. The API failure detection and processing computing platform 110 may evaluate the error code to determine whether it is a recognized error code (e.g., whether the error code is stored in a database or was previously received). If so, the API failure detection and processing computing platform may identify a mitigation action to execute to remedy or fix the error. For instance, a mitigation action stored in the database in association with the error code may be identified. In some examples, machine learning may be used to analyze error codes and identify a mitigation action to execute. For instance, a machine learning model trained using historical error and mitigation data may be executed to determine a mitigation action for a received error code.

In some examples, a confidence score associated with the mitigation action may be identified. For instance, if the error code has been received and/or stored multiple times and the mitigation action has been used at least a threshold number of times to address the error code, a first confidence score may be identified. If the error code has been received and/or store one time or a few times, and the mitigation action has not been used at least the threshold number of times to address the error code, a second confidence score may be assigned. Although two confidence score are described, more than two scores may be assigned based on various factors, number of times the error code was received, or the like.

In some examples, if the confidence score is above a threshold, the identified mitigation action may be automatically implemented or executed to address the issue. If the score is below a threshold, in some examples, additional investigation may be performed. For instance, a request for user input to confirm implementing the mitigation action may be sent to, for instance, internal entity computing device 140. In another example, API failure detection and processing computing platform 110 may analyze the error code to determine whether an automated response is available for mitigation. If so, the automated response may be identified and implemented or, in some examples, may also have a confidence score that may determine whether automatic implementation is available.

Additionally or alternatively, API details associated with the detached or removed API may be transmitted to a user for investigation. For instance, API details may be transmitted to internal entity computing device 140 for user investigation of the error and remedy for instance if the error code is not a recognized error code. In some examples, internal entity computing device 140 may be associated with a support team that may investigate the error and determine whether it is an infrastructure issue or a code issue. If a code issue is identified, further investigation and processing may be performed by, for instance, the support team. If the issue is an infrastructure issue, the issue may be addressed manually and steps taken to address the issue, as well as the associated error code, may be stored in a database. In some examples, a confidence score may be associated with the steps taken and error code. Accordingly, if the error is received again, it will be recognized and may have a low confidence score (e.g., because one occurrence of the error may have been received and addressed). However, as the error is received and addressed additional times, the confidence score may be increased. Upon reaching a threshold confidence score, the system may determine that the response may be automated and may automatically implement the mitigation action.

At step 226, the issue causing the error or failed API may be remedied. For instance, the contingency process may have been successful and the error addressed (e.g., via automatic implementation of a mitigation action, via user input or investigation, or the like).

Figure 2F:
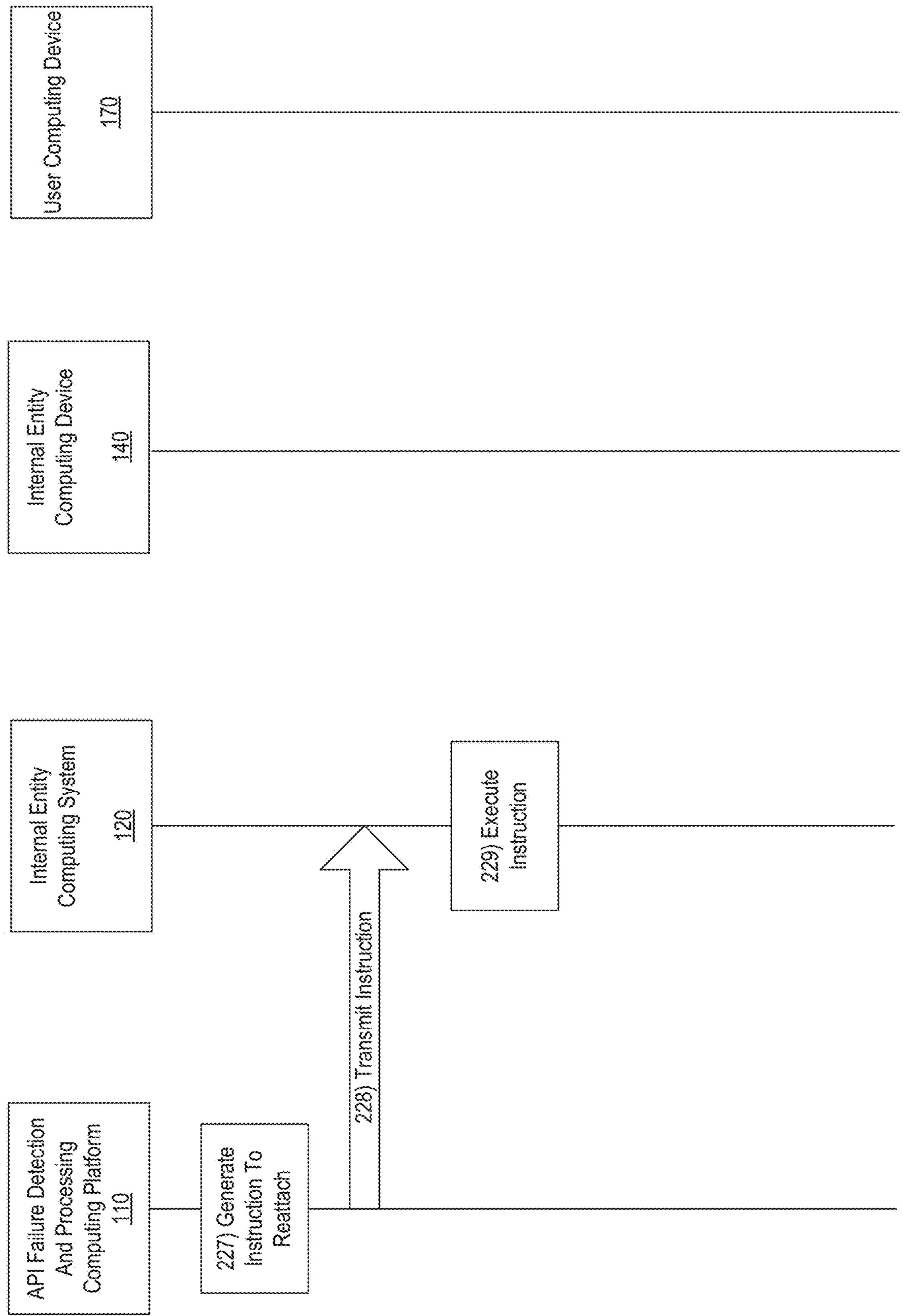

With reference to FIG. 2F, at step 227, API failure detection and processing computing platform 110 may generate an instruction to reattach or reactivate the previously detached or removed API. For instance, based on the remedy performed in step 226, the API may be reactivated or reattached to the application flow to enable the previously disabled functionality associated with the API and enable calls to the API.

At step 228, the API failure detection and processing computing platform 110 may transmit or send the generated instruction to the internal entity computing system 120. At step 229, the generated instruction may be executed by the internal entity computing system 120. For instance, instruction to reattach or reactive the API may be pushed to the user interface layer of the application to modify one or more graphical user interfaces associated with the API to, again, provide functionality associated with the API. For instance, options that were previously unavailable for selection when the API was detached may again be available for selection and the graphical user interfaces may be modified to indicate the availability. For example, FIG. 5 illustrates an example graphical user interface 500 including the options shown in interface 400 in FIG. 4, however, all four options are now available for selection (e.g., option 3 is no longer grayed out). Accordingly, the API associated with option 3 has been reattached or reactivated and, accordingly, functionality associated with that API may be shown as available, as in interface 500.

Figure 3:
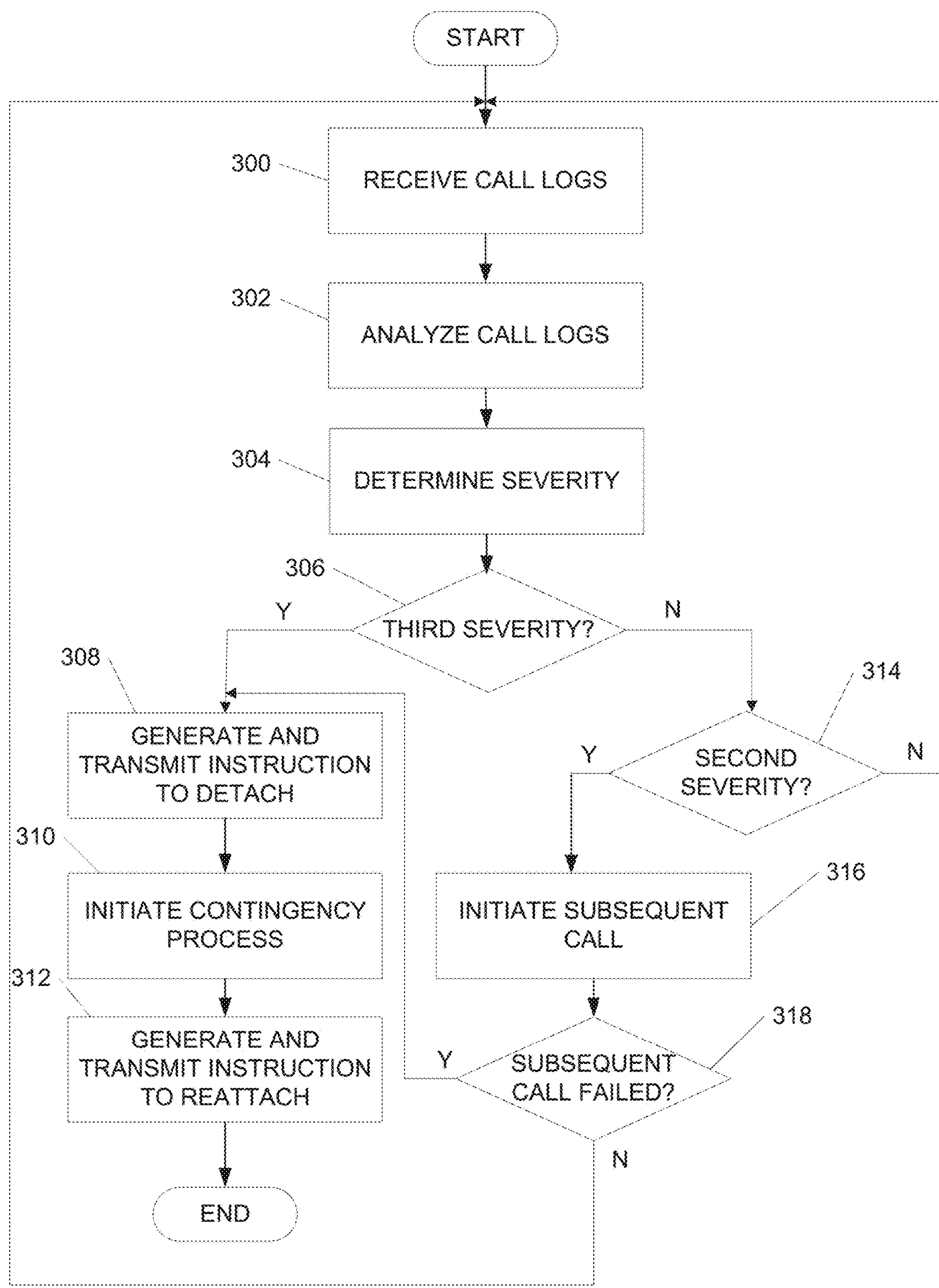
FIG. 3 illustrates an illustrative method for implementing API failure detection and processing functions according to one or more aspects described herein.

FIG. 3 is a flow chart illustrating one example method of implementing API failure detection and processing functions in accordance with one or more aspects described herein. The processes illustrated in FIG. 3 are merely some example processes and functions. The steps shown may be performed in the order shown, in a different order, more steps may be added, or one or more steps may be omitted, without departing from the invention. In some examples, one or more steps may be performed simultaneously with other steps shown and described. One of more steps shown in FIG. 3 may be performed in real-time or near real-time.

At step 300, call logs may be received from one or more computing devices or systems hosting one or more applications, the one or more applications having a plurality of APIs associated therewith. For instance, call logs including calls made to APIs associated with the one or more applications, as well as response codes generated based on the calls made may be received. In some examples, the call logs may include a record of each call to each API and a response code generated for each call to each API.

At step 302, the call logs may be analyzed to detect failures or failure codes generated in response to one or more calls.

At step 304, a severity associated with each API may be generated or determined. For instance, a number of failures associated with each API may be identified and a severity determined. For instance, if no failures are detected, a first severity may be assigned to the API. If first number of failures is detected, a second severity may be assigned to the API. If a second number of failures greater than the first number of failures is identified, a third severity may be assigned. In some examples, the second number of failures may include at least a predetermined number of consecutive failures. Further, although three severity levels are described, more or fewer may be used without departing from the invention.

In some examples, the APIs may be further analyzed to determine whether additional processing should be performed. For instance, at step 306, one or more APIs may be analyzed to determine whether they have been assigned the third severity. For at least one API having the third severity, at step 308, an instruction to detach the API from the application or application flow may be generated and transmitted (e.g., to the device or system hosting the application). In some examples, detaching the at least one API having the third severity may include disabling a function of the application associated with the at least one API having the third severity. In some arrangements, disabling the function may include modifying a graphical user interface to indicate the function is unavailable for selection (e.g., grayed out).

At step 310, a contingency process may be initiated to address an error causing the API failure. In some examples, the contingency process may include determining whether an error code associated with the failure matches a known error code (e.g., matches a previously received error code stored in a database). If the error code matches, a mitigating action associated with the previously received instance of the error code may be identified and, in some examples, automatically implemented or executed to address the error.

In some examples, if the error code does not match, additional investigation may be performed.

At step 312, based on execution of the mitigating action to address the error causing the failure, an instruction to reattach the API may be generated and transmitted (e.g., to the system or device hosting the application). In some examples, reattaching the API may include reactivating or returning the API to the application or application flow and enabling a function of the application that was previously disabled when the API was detached. In some examples, that may include modifying the graphical user interface to enable selection of options associated with the API being reattached.

If, at step 306, an API has not been assigned a third severity, at step 314 the system may determine whether the API has been assigned a second severity. If not, the process may return to step 300 to receive additional call logs.

If, at step 314, the API has been assigned the second severity, at step 316, one or more subsequent calls to the API may be initiated. For instance, sample request data for the API may be retrieved and one or more subsequent or additional calls may be initiated. The response codes associated with the one or more additional or subsequent calls may be received via updated call logs and analyzed.

At step 318, a determination may be made as to whether the one or more subsequent or additional calls failed. If so, the process may proceed to step 308 to generate and transmit an instruction to detach the API having the second severity. If not, the process may return to step 300 to receive additional call logs.

Accordingly, aspects described herein are related to efficiently and, in real-time, detecting API failures associated with an application, evaluating the API and, if the API is failing, detaching or deactivating the API to dynamically isolate impacted flows and save other parts of the application from being impacted. For instance, by detaching or deactivating failing APIs, an application may continue to run without diverting resources to the failing API, which may lead to customer delays and potentially an application or system failure. Accordingly, the system may dynamically remove calls to the failing API from the overall architecture while allowing other flows (e.g., calls to other APIs) to proceed without interruption.

In addition, the system may automatically implement known fixes to reduce the time a failing API is removed or detached from the application. This may improve response time with respect to mitigating issues and may improve an overall application experience. The failing APIs may then be quickly reattached or reactivated in order to restore functionality to the application.

Accordingly, arrangements discussed herein may include continuously monitoring call logs to identify failures. In some examples, the call logs may be received in real-time as calls are made, as a failure is detected, or the like. Additionally or alternatively, the call logs may be received in a batch transfer or process as schedule intervals, on a periodic basis, or the like.

As discussed herein, upon determining that an API should be detached, one or more markers or indicator may be transmitted to the application or system hosting the application to disable functionality associated with the API, prevent calls to the API, and the like. In some arrangements, an API may be identified as failing based on analysis of a first application but may also be used with other applications. In some examples, the API may be detached from the other applications as well as the application from which the failing API was identified. Additionally or alternatively, a notification may be sent to the other applications indicating that the API is failing which may cause the other applications to initiate call log transfer, and the like, that may initiate an evaluation of the APIs associated with the other applications.

As discussed herein, upon remedying the error that cause the API failure, the API may be automatically reattached or reactivated to efficiently return functionality to the application.

Figure 6:
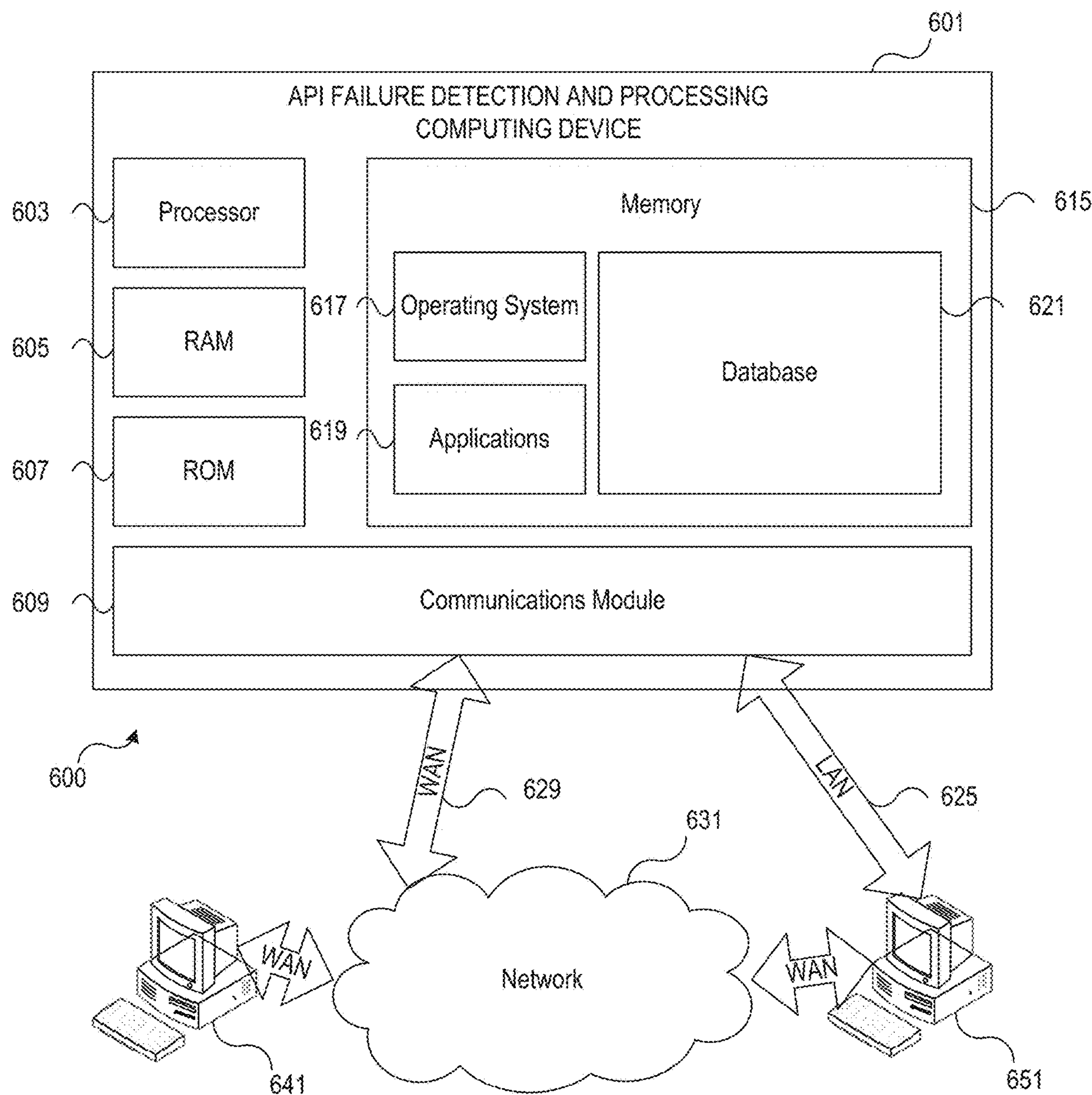
FIG. 6 illustrates one example environment in which various aspects of the disclosure may be implemented in accordance with one or more aspects described herein.

FIG. 6 depicts an illustrative operating environment in which various aspects of the present disclosure may be implemented in accordance with one or more example embodiments. Referring to FIG. 6, computing system environment 600 may be used according to one or more illustrative embodiments. Computing system environment 600 is only one example of a suitable computing environment and is not intended to suggest any limitation as to the scope of use or functionality contained in the disclosure. Computing system environment 600 should not be interpreted as having any dependency or requirement relating to any one or combination of components shown in illustrative computing system environment 600.

Computing system environment 600 may include API failure detection and processing computing device 601 having processor 603 for controlling overall operation of API failure detection and processing computing device 601 and its associated components, including Random Access Memory (RAM) 605, Read-Only Memory (ROM) 607, communications module 609, and memory 615. API failure detection and processing computing device 601 may include a variety of computer readable media. Computer readable media may be any available media that may be accessed by API failure detection and processing computing device 601, may be non-transitory, and may include volatile and non-volatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by API failure detection and processing computing device 601.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on API failure detection and processing computing device 601. Such a processor may execute computer-executable instructions stored on a computer-readable medium.

Software may be stored within memory 615 and/or storage to provide instructions to processor 603 for enabling API failure detection and processing computing device 601 to perform various functions as discussed herein. For example, memory 615 may store software used by API failure detection and processing computing device 601, such as operating system 617, application programs 619, and associated database 621. Also, some or all of the computer executable instructions for API failure detection and processing computing device 601 may be embodied in hardware or firmware. Although not shown, RAM 605 may include one or more applications representing the application data stored in RAM 605 while API failure detection and processing computing device 601 is on and corresponding software applications (e.g., software tasks) are running on API failure detection and processing computing device 601.

Communications module 609 may include a microphone, keypad, touch screen, and/or stylus through which a user of API failure detection and processing computing device 601 may provide input, and may also include one or more of a speaker for providing audio output and a video display device for providing textual, audiovisual and/or graphical output. Computing system environment 600 may also include optical scanners (not shown).

API failure detection and processing computing device 601 may operate in a networked environment supporting connections to one or more remote computing devices, such as computing devices 641 and 651. Computing devices 641 and 651 may be personal computing devices or servers that include any or all of the elements described above relative to API failure detection and processing computing device 601.

The network connections depicted in FIG. 6 may include Local Area Network (LAN) 625 and Wide Area Network (WAN) 629, as well as other networks. When used in a LAN networking environment, API failure detection and processing computing device 601 may be connected to LAN 625 through a network interface or adapter in communications module 609. When used in a WAN networking environment, API failure detection and processing computing device 601 may include a modem in communications module 609 or other means for establishing communications over WAN 629, such as network 631 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing platform, comprising:

at least one processor;

a communication interface communicatively coupled to the at least one processor; and a memory storing computer-readable instructions that, when executed by the at least one processor, cause the computing platform to:

receive call logs associated with application programming interface (API) calls associated with an application, the application including a plurality of application programming interfaces;

analyze the call logs to determine a severity for each API, wherein the severity is one of: a first severity having no failures, a second severity having a first number of failures, and a third severity having a second number of failures greater than the first number of failures;

identify, based on the analyzed call logs, one or more APIs having a third severity;

for at least one API having the third severity, transmit an instruction to detach the at least one API having the third severity from the application; and transmit a notification of the detaching of the at least one API having the third severity from the application.

2. The computing platform of claim 1, further including instructions that, when executed, cause the computing platform to:

for at least one API having the second severity:

trigger a subsequent call to the at least one API having the second severity;

determine, based on an outcome of the subsequent call to the at least one API having the second severity, whether the subsequent call was a failure;

responsive to determining that the subsequent call was a failure, transmit an instruction to detach the at least one API having the second severity from the application; and transmit a notification of the detaching of the at least one API having the second severity from the application.

3. The computing platform of claim 1, wherein the call logs include a record of each call to each API and a response code generated for each call to each API.

4. The computing platform of claim 1, wherein the second number of failures includes at least a predetermined number of consecutive failures.

5. The computing platform of claim 1, wherein detaching the at least one API having the third severity includes disabling a function of the application associated with the at least one API having the third severity.

6. The computing platform of claim 5, wherein disabling the function of the application associated with the at least one API having the third severity includes modifying a graphical user interface to indicate the function is unavailable for selection.

7. The computing platform of claim 1, further including instructions that, when executed, cause the computing platform to:

for the at least one API having the third severity:

trigger a contingency process to address an error causing failure of the API, triggering the contingency process including:

determine that the error matches a previously received error;

identify a mitigating action associated with the previously received error; and automatically execute the identified mitigating action to address the error.

8. The computing platform of claim 7, further including instructions that, when executed, cause the computing platform to:

after automatically executing the identified mitigating action, transmit an instruction to reattach the at least one API having the third severity, wherein reattaching the at least one API having the third severity includes enabling a function of the application associated with the at least one API having the third severity that was disabled when the at least one API having the third severity was detached.

9. A method, comprising:

receiving, by a computing device, the computing device having at least one processor, and memory, call logs associated with application programming interface (API) calls associated with an application, the application including a plurality of application programming interfaces;

analyzing, by the at least one processor, the call logs to determine a severity for each API, wherein the severity is one of: a first severity having no failures, a second severity having a first number of failures, and a third severity having a second number of failures greater than the first number of failures;

identify, by the at least one processor and based on the analyzed call logs, one or more APIs having a third severity;

for at least one API having the third severity, transmitting, by the at least one processor, an instruction to detach the at least one API having the third severity from the application; and transmitting, by the at least one processor, a notification of the detaching of the at least one API having the third severity from the application.

10. The method of claim 9, further including:

for at least one API having the second severity:

triggering, by the at least one processor, a subsequent call to the at least one API having the second severity;

determining, by the at least one processor and based on an outcome of the subsequent call to the at least one API having the second severity, whether the subsequent call was a failure;

responsive to determining that the subsequent call was a failure, transmitting, by the at least one processor, an instruction to detach the at least one API having the second severity from the application; and transmitting, by the at least one processor, a notification of the detaching of the at least one API having the second severity from the application.

11. The method of claim 9, wherein the call logs include a record of each call to each API and a response code generated for each call to each API.

12. The method of claim 9, wherein the second number of failures includes at least a predetermined number of consecutive failures.

13. The method of claim 9, wherein detaching the at least one API having the third severity includes disabling a function of the application associated with the at least one API having the third severity.

14. The method of claim 13, wherein disabling the function of the application associated with the at least one API having the third severity includes modifying a graphical user interface to indicate the function is unavailable for selection.

15. The method of claim 9, further including:

for the at least one API having the third severity:

triggering, by the at least one processor, a contingency process to address an error causing failure of the API, triggering the contingency process including:

determining, by the at least one processor, that the error matches a previously received error;

identifying, by the at least one processor, a mitigating action associated with the previously received error; and automatically executing, by the at least one processor, the identified mitigating action to address the error.

16. The method of claim 15, further including:

after automatically executing the identified mitigating action, transmitting, by the at least one processor an instruction to reattach the at least one API having the third severity, wherein reattaching the at least one API having the third severity includes enabling a function of the application associated with the at least one API having the third severity that was disabled when the at least one API having the third severity was detached.

17. One or more non-transitory computer-readable media storing instructions that, when executed by a computing platform comprising at least one processor, memory, and a communication interface, cause the computing platform to:

receive call logs associated with application programming interface (API) calls associated with an application, the application including a plurality of application programming interfaces;

analyze the call logs to determine a severity for each API, wherein the severity is one of: a first severity having no failures, a second severity having a first number of failures, and a third severity having a second number of failures greater than the first number of failures;

identify, based on the analyzed call logs, one or more APIs having a third severity;

for at least one API having the third severity, transmit an instruction to detach the at least one API having the third severity from the application; and transmit a notification of the detaching of the at least one API having the third severity from the application.

18. The one or more non-transitory computer-readable media of claim 17, further including instructions that, when executed, cause the computing platform to:

for at least one API having the second severity:

trigger a subsequent call to the at least one API having the second severity;

determine, based on an outcome of the subsequent call to the at least one API having the second severity, whether the subsequent call was a failure;

responsive to determining that the subsequent call was a failure, transmit an instruction to detach the at least one API having the second severity from the application; and transmit a notification of the detaching of the at least one API having the second severity from the application.

19. The one or more non-transitory computer-readable media of claim 17, wherein detaching the at least one API having the third severity includes disabling a function of the application associated with the at least one API having the third severity.

20. The one or more non-transitory computer-readable media of claim 19, wherein disabling the function of the application associated with the at least one API having the third severity includes modifying a graphical user interface to indicate the function is unavailable for selection.

21. The one or more non-transitory computer-readable media of claim 17, further including instructions that, when executed, cause the computing platform to:

for the at least one API having the third severity:

trigger a contingency process to address an error causing failure of the API, triggering the contingency process including:

determining that the error matches a previously received error;

identifying a mitigating action associated with the previously received error; and automatically executing the identified mitigating action to address the error.

* * * * *